United States Patent Office 2,767,172
Patented Oct. 16, 1956

2,767,172

PROCESS FOR THE PRODUCTION OF N-BENZYL-IDENE AND N-QUINOLYLMETHYLENE-SUB-STITUTED 2-AMINOBENZ-ISOTHIAZOLONES

Leon Katz, Springfield, N. J., and William Schroeder, West Lafayette, Ind., assignors to Schenley Industries, Inc., New York, N. Y., a corporation of Delaware No Drawing. Application December 29, 1954, Serial No. 478,508

3 Claims. (Cl. 260—240)

The present invention relates to a process of preparing N-benzylidene (N-benzal) and N-quinolylmethylene-substituted 2-aminobenzisothiazolones and comprises a process involving the reaction of thionyl chloride or an aromatic sulfonyl chloride with a benzylidene or quinolylmethylene thiosalicylhydrazide to effect a ring closure.

In accordance with a preferred process of this invention, a benzylidenethiosalicylhydrazide is reacted with thionyl chloride or with an aromatic sulfonyl chloride in the presence of an alkali. The reaction mechanism has not been conclusively established but the overall reaction with thionyl chloride may be represented by the following equation:

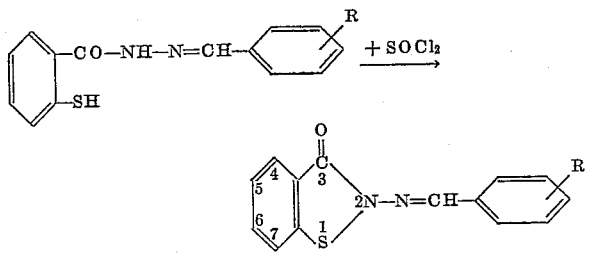

in which R is one or more alkyl, alkoxy, halogen or other radicals substituted in the phenyl radical that are inert to thionyl chloride. The yield of product is substantially that stoichiometrically computed from the foregoing equation. A similar reaction is involved when aromatic sulfonyl chlorides are used, the initial product being an intermediate which is subsequently hydrolyzed.

In conducting the reaction, the aromatic sulfonyl chloride, such as benzenesulfonyl chloride or para-toluene-sulfonyl chloride, is added to a stirred solution of the benzylidenethiosalicylhydrazide in dioxane or other inert solvent containing a sufficient amount of an alkali, such as sodium hydroxide or potassium hydroxide, to take up the hydrogen chloride that is involved in the reaction and to hydrolyze the intermediate compound. When thionyl chloride is used, the solvent and alkali may be omitted and the hydrogen chloride expelled as described in Example 2 hereinafter.

The reaction is spontaneous at normally prevailing room temperatures but the mixture may be heated to hasten the reaction, if desired. Crystals may separate during the addition of the thionyl chloride or the aromatic sulfonyl chloride. The product is then isolated from the reacted mixture by conventional methods, which include either evaporation of the solvent or precipitation of the product from solution with water, followed optionally by recrystallization.

The following examples are preferred methods of practicing the process of the present invention:

*Example 1.*—Production of 2 - (2,4 - dichlorobenzylideneamino)benzisothiazolone having the formula

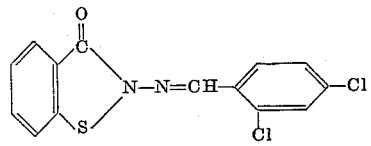

A solution of 0.88 gram (0.005 mole) of benzenesulfonyl chloride in 10 milliliters of dioxane was added dropwise to a well-stirred solution of 3.25 grams (0.010 mole) of 2,4 - dichlorobenzylidene thiosalicylhydrazide (M. P. 211–216° C.), whose preparation is described in Example 5 of the copending application of Leon Katz, Serial No. 350,510 and in the article by Leon Katz, Lawrence S. Karger, William Schroeder and Murray S. Cohen, in J. Org. Chem., October 1953, vol. 18, No. 10, pages 1380 to 1402, and 0.66 gram (0.01 mole) of potassium hydroxide in 50 milliliters of dioxane. Crystals separated as the reaction proceeded. The mixture was stirred for one-half hour after the addition was completed and then an equal quantity of water was added and the crystals were separated. There was obtained 3 grams of a product having a melting point of 240–241° C. After recrystallizing the product twice from a mixture of methanol and dimethylformamide, 2.0 grams of yellow needles, having a melting point of 232–234° C., remained.

This product was identical with that prepared in Example 1 of our copending application Serial No. 478,507, filed concurrently herewith.

*Example 2.*—The foregoing compound can also be made in the following manner:

Five (5) grams (0.015 mole) of 2,4-dichlorobenzylidenethiosalicylhydrazide was mixed with 25 milliliters of thionyl chloride at room temperature. The compound dissolved with the liberation and evolution of hydrogen chloride to give a deep-yellow-colored solution which soon started to deposit crystals and then set to a solid mass. Ether was added to form a slurry and the crystals were collected and washed with a further quantity of fresh ether. After drying in the oven, there was obtained 4.5 grams of yellow needle-like crystals which had a melting point of 230–232° C. and which, upon further recrystallization from dimethylformamide, was raised to 232–234° C.

By substituting other benzylidenethiosalicylhydrazides and quinolylmethylenethiosalicylhydrazides such as those disclosed, or which can be made in accordance with the methods disclosed, in the copending application of Leon Katz, Serial No. 350,510, and in the article in J. Org. Chem. referred to hereinbefore, for that used in the foregoing examples, any of the other N-benzylidene and N-quinolylmethylene-substituted 2 - aminobenzisothiazolones disclosed and claimed in our copending application Serial No. 478,507 can be made, except those containing a hydroxyl, carboxyl, amino or acetamino radical which itself reacts with thionyl chloride, preventing ring closure. However, alkyl, alkoxy, halogen and similar unreactive substituents in the benzylidene or quinolylmethylene thiosalicylhydrazide do not interfere in the reaction.

By use of the foregoing general methods, the additional substituted 2-aminobenzisothiazolones listed in the following table have been prepared. All of these compounds correspond to the general formula given above in which the phenyl radical is replaced by radicals having the formulae given.

| | M. P., °C |
|---|---|
| 2-(3,4-Dichlorobenzylideneamino)benzisothiazolone | 238–239 |
| 2-(2-Methoxybenzylideneamino)benzisothiazolone | 195–196 |
| 2-(2-Ethoxybenzylideneamino)benzisothiazolone | 160–162 |
| 2-(2-n-Propoxybenzylideneamino)benzisothiazolone | 115–117 |
| 2-(2-n-Butoxybenzylideneamino)benzisothiazolone | 115–116 |
| 2-(2-n-Amyloxybenzylideneamino)benzisothiazolone | 103–104 |
| 2-(4-β-Chloroethoxybenzylideneamino)benzisothiazolone | 175–177 | and also the following compounds which have substituents in the benzisothiazolone nucleus:

| | M. P., ° C. |
|---|---|
| 2 - (4 - quinolylmethyleneamino) - 5 - chlorobenzisothiazolone | 214–216 |
| 2 - (4 - quinolylmethyleneamino) - 5,7 - dichlorobenzisothiazolone | 253–254 |
| 2 - (4 - quinolylmethyleneamino) - 6 - methylsulfonylbenzisothiazolone | 271–272 |

Certain of the compounds described herein and alternative methods for their production are disclosed and claimed in our copending application Serial No. 478,507 that was filed concurrently herewith. The compounds which can be made in accordance with the process of the present invention have exhibited activity against the following microorganisms:

*Staphylococcus aureus* FDA 209 (gram-positive)
*Proteus vulgaris* NRRL B–417 (gram-positive)
*Pseudomona aeruginosa* Gottlieb 29 (gram-negative)
*Trichophyton mentagrophytes* ATCC 8757
*Candida albicans* ATCC 10231 and the following three compounds inhibited the growth in vitro of *Brucella abortus* MSL 1515 at a concentration within the range 0.5 to 1.25 gammas (micrograms) per milliliter:

2-(3,4-dichlorobenzylideneamino)benzisothiazolone
2-(4-quinolylmethyleneamino)benzisothiazolone, and
2-(2-methoxybenzylideneamino)benzisothiazolone.

Inasmuch as the foregoing specification comprises preferred embodiments of the invention, it is to be understood that the invention is not restricted thereto and that variations and modifications can be made therein in conventional manner without departing from the invention whose scope is limited solely by the appended claims.

We claim:

1. A process for the production of a substituted 2-aminobenzisothiazolone which comprises subjecting to the action of an acid chloride of the group consisting of thionyl chloride and aromatic sulfonyl chlorides, a thiosalicylhydrazide having the formula

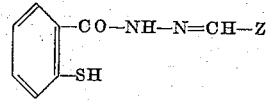

in which Z is a radical of the group consisting of phenyl, quinolyl, and phenyl and quinolyl radicals substituted by alkyl, alkoxy, and halogen radicals, and, when an aromatic sulfonyl chloride is used as the acid chloride reactant, preliminarily hydrolyzing the resulting intermediate product to the substituted 2-aminobenzisothiazolone, and subsequently recovering, in either case, the substituted 2-aminobenzisothiazolone thus formed.

2. A process for the production of 2-benzylideneaminobenzisothiazolone which comprises subjecting benzylidenethiosalicylhydrazide to the action of an acid chloride of the group consisting of thionyl chloride and aromatic sulfonyl chlorides, and, when an aromatic sulfonyl chloride is used as the acid chloride reactant, preliminarily hydrolyzing the resulting intermediate product to the substituted 2-aminobenzisothiazolone, and subsequently recovering, in either case, the 2-benzylideneaminobenzisothiazolone.

3. A process for the production of a 2-quinolylmethyleneaminobenzisothiazolone which comprises subjecting a quinolylmethylenethiosalicylhydrazide to the action of an acid chloride of the group consisting of thionyl chloride and aromatic sulfonyl chlorides, and, when an aromatic sulfonyl chloride is used as the acid chloride reactant, preliminarily hydrolyzing the resulting intermediate product to the substituted 2-aminobenzisothiazolone, and subsequently recovering, in either case, the 2-quinolylmethyleneaminobenzisothiazolone thus formed.

No references cited.